United States Patent
Liu et al.

(10) Patent No.: US 12,247,838 B2
(45) Date of Patent: Mar. 11, 2025

(54) CLOUD-BASED DYNAMIC VEHICLE SHARING SYSTEM AND METHOD

(71) Applicant: Ford Global Technologies, LLC, Dearborn, MI (US)

(72) Inventors: Yimin Liu, Ann Arbor, MI (US); Perry Robinson MacNeille, Lathrup Village, MI (US); Erica Klampfl, Canton, MI (US); Kevin Cooper, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 673 days.

(21) Appl. No.: 15/999,853

(22) PCT Filed: Feb. 18, 2016

(86) PCT No.: PCT/US2016/018410
§ 371 (c)(1),
(2) Date: Aug. 20, 2018

(87) PCT Pub. No.: WO2017/142536
PCT Pub. Date: Aug. 24, 2017

(65) Prior Publication Data
US 2021/0215491 A1    Jul. 15, 2021

(51) Int. Cl.
*G01C 21/00*    (2006.01)
*G01C 21/34*    (2006.01)
(Continued)

(52) U.S. Cl.
CPC ......... *G01C 21/3438* (2013.01); *G06Q 10/02* (2013.01); *G06Q 30/0206* (2013.01); *G07C 5/006* (2013.01)

(58) Field of Classification Search
CPC ............... G01C 21/3438; G06Q 10/02; G06Q 30/0206; G07C 5/006
See application file for complete search history.

(56) References Cited

U.S. PATENT DOCUMENTS

| 5,289,369 A | 2/1994 | Hirshberg |
| 6,006,148 A | 12/1999 | Strong |

(Continued)

FOREIGN PATENT DOCUMENTS

| CN | 100541159 C | * 9/2009 | ............ B61F 15/20 |
| CN | 102354405 A | 2/2012 | |

(Continued)

OTHER PUBLICATIONS

International Search Report for PCT/US2016/018410 dated Apr. 4, 2016, 2 pages.

(Continued)

*Primary Examiner* — Adam M Alharbi
(74) *Attorney, Agent, or Firm* — Brooks Kushman PC

(57) ABSTRACT

A system and method for vehicle sharing include a vehicle having sensors, a vehicle computing system (VCS) including a processor and a memory communicating with the sensor and programmed to store sensor data associated with a vehicle sharing trip, and a human-machine interface (HMI) communicating with the VCS and displaying a vehicle sharing trip cost using the sensor data associated with vehicle and/or vehicle component wear and tear incurred during the trip, trip cost savings based on the pricing method, and presenting related coupons. Vehicle sharing cost may be determined for a vehicle use, driver, route, road conditions, parking behavior, weather, etc. based on data from vehicle sensors and external sensors to detect ambient and operating conditions. Sensor data may be communicated to cloud-based networks for processing, analysis, and cost determination using models associating sensor data with component wear, driver's characteristics, historical behavior, and related maintenance and repair cost.

9 Claims, 13 Drawing Sheets

(51) Int. Cl.
  *G06Q 10/02*    (2012.01)
  *G06Q 30/0201*  (2023.01)
  *G07C 5/00*     (2006.01)

(56) References Cited

U.S. PATENT DOCUMENTS

| | | |
|---|---|---|
| 6,748,305 B1 | 6/2004 | Klausner et al. |
| 7,343,306 B1 | 3/2008 | Bates et al. |
| 9,087,099 B2 | 7/2015 | Camacho et al. |
| 2002/0143464 A1 | 10/2002 | Blewitt |
| 2012/0022781 A1 | 1/2012 | Wilson |
| 2014/0067491 A1 | 3/2014 | James et al. |
| 2015/0100505 A1 | 4/2015 | Binion et al. |
| 2015/0310744 A1 | 10/2015 | Farrelly et al. |
| 2015/0348058 A1 | 12/2015 | Liu et al. |
| 2016/0071082 A1* | 3/2016 | Driscoll .............. G06Q 20/145 705/13 |
| 2017/0083822 A1* | 3/2017 | Adendorff ............. G07C 5/006 |

FOREIGN PATENT DOCUMENTS

| | | | |
|---|---|---|---|
| CN | 103514737 A | 1/2014 | |
| CN | 108986251 A * | 12/2018 | .............. E02F 3/142 |
| DE | 102009025278 A1 | 12/2010 | |
| EP | 0232213 A2 * | 9/2018 | |
| JP | 2003281681 A | 10/2003 | |

OTHER PUBLICATIONS

Chinese Office Action for Chinese Application No. 201680082122.7 dated Oct. 11, 2021; 17 pages.

\* cited by examiner

CLOUD-BASED DYNAMIC VEHICLE SHARING SYSTEM AND METHOD

TECHNICAL FIELD

Aspects of the disclosure relate to a vehicle sharing system including a vehicle computing and telematics system communicating data to cloud-based servers to provide dynamic payment calculation or pricing for vehicle sharing operators, including peer to peer vehicle sharing, shared lease and other forms of vehicle or car sharing, ride sharing or car-pooling.

BACKGROUND

Vehicle manufacturers and some rental and leasing companies are beginning to explore vehicle sharing arrangements for purchase, lease, or ride sharing of a single vehicle or a group of shared vehicles. This may provide advantages relative to traditional informal carpooling or sharing arrangements. For each participant that rents or purchases a vehicle, amortized costs may be reduced by increasing utilization of a particular vehicle. Companies in the business of vehicle sharing generally have more sophisticated tracking and accounting of vehicle use and maintenance costs as well as cost or payment calculations relative to individuals that may want to participate as vehicle providers in a vehicle sharing arrangement. Individuals may be uncertain of whether generated revenue exceeds the associated costs of maintenance, depreciation, insurance, etc. Similarly, individual users may be hesitant to rent or share an owned or leased vehicle due to the uncertainty associated with how the vehicle will be driven or used by another participant, as well as the uncertainty in assessing any fees for the actual use of the vehicle, other than a mileage charge, for example.

SUMMARY

In various embodiments, a vehicle sharing method or system includes sensors and a processor programmed to receive sensor data associated with operation of a vehicle by a vehicle sharing user during a trip and calculate a vehicle sharing cost associated with anticipated maintenance of a vehicle component based on the sensor data from the trip, historical information and customer characteristics (e.g. repeated ride-sharing customers, or the years of owning a vehicle). The processor may be further programmed to communicate the vehicle sharing cost for display on a vehicle HMI. The sensor may be embedded within the vehicle, and the processor may receive data from external sensors to detect or determine a particular vehicle use, route, driver behavior, and the like. The processor may be programmed to calculate the vehicle sharing cost by comparing the sensor data to previously stored expected values in a vehicle component wear model, and to determine a route for the trip based on the sensor data from the trip. The vehicle sharing cost may be determined based on historical sensor data associated with the route for the trip. The vehicle sharing cost may be also determined based on historical driving behaviors and customers' characteristics.

In various embodiments, the processor comprises a mobile device processor wirelessly linked to the vehicle. The processor may also be implemented by a vehicle computing system (VCS) processor or a cloud-based server. The processor may be further programmed to calculate the vehicle sharing cost based on vehicle location during the trip with the vehicle location determined based on the sensor data. The sensor may wirelessly communicate sensor data to the processor over a vehicle network, cellular network, and/or the internet.

In one embodiment, a vehicle sharing system includes a vehicle having a vehicle component sensor, a vehicle computing system (VCS) including a processor and a memory in communication with the sensor and programmed to store sensor data associated with a vehicle sharing trip, and a human-machine interface (HMI) communicating with the VCS and displaying a vehicle sharing trip cost at least in part based on the sensor data being associated with wear and tear incurred during the trip. The VCS may be programmed to receive trip-related data from a second sensor externally located relative to the vehicle and to transmit the sensor data to a cloud-based server, which may calculate the vehicle sharing trip cost based on the sensor data and a model that associates sensor data with maintenance cost of at least one component of the vehicle. The vehicle sharing system may also include a mobile device having a processor selectively wirelessly coupled to the VCS and programmed to calculate the vehicle sharing trip cost.

Embodiments may also include a method for sharing a vehicle that includes receiving, by a processor, data from a vehicle sensor and an external sensor associated with operation of a vehicle during a vehicle sharing trip, calculating, by the processor, a vehicle sharing cost associated with vehicle wear and tear during the vehicle sharing trip based on the data from the vehicle sensor and the external sensor, and communicating the vehicle sharing cost to a vehicle user interface. The method may include communicating the vehicle sharing cost from a cloud-based server. In one embodiment, the method includes a programmed mobile device having instructions, that, when executed perform a method that receives the sensor data, integrates with other data in the cloud, such as historical travel data and customer information, calculates the vehicle sharing cost, and communicates the cost to a user interface of the mobile device.

Embodiments according to the present disclosure may provide one or more advantages. For example, one or more embodiments provide car-sharing operators dynamic payment or real-time pricing calculations based on actual vehicle usage that may include past or current driving behavior, owning a vehicle or not, weather and road/parking conditions, etc. Embodiments according to the disclosure may collect the driving behavior data of users and ensure car-sharing lenders are compensated for actual or potential future wear and tear associated with operation of the vehicle that is otherwise difficult to detect. The system may use a vehicle telematics unit and/or linked user mobile device to gather and report vehicle use data for dynamic pricing analysis, building a historical database for car-sharing users, and score the risk levels of users. When multiple users rent a vehicle and ride together, each driver may have a different car-sharing payment.

Various embodiments of a vehicle sharing system or method according to the disclosure may provide incentives to vehicle owners to participate in car-sharing arrangements and to attract and retain users that drive safely and carefully. Efficient use of cloud-based servers allows for detection of rare events as well as nominal user behavior that may affect the cost of a particular vehicle-sharing trip. The vehicle computing system may be used to collect and store data in-place with subsequent transfer of data to cloud-based servers allowing for much larger data stores and off-line analysis of data in the cloud. Collected data may be used to provide suggested vehicle maintenance and/or offer related personalized extended service plans to car-sharing lenders based on vehicle use. With the advanced connected vehicle and telematics technology, it is possible to accurately track vehicle usage costs and determine pricing for shared vehicle ownership and increase the customer base of vehicle sharing.

The above advantages and other advantages and features associated with various embodiments will be readily apparent to those of ordinary skill in the art from the following detailed description when taken in connection with the accompanying drawings.

DETAILED DESCRIPTION

Figure 1:
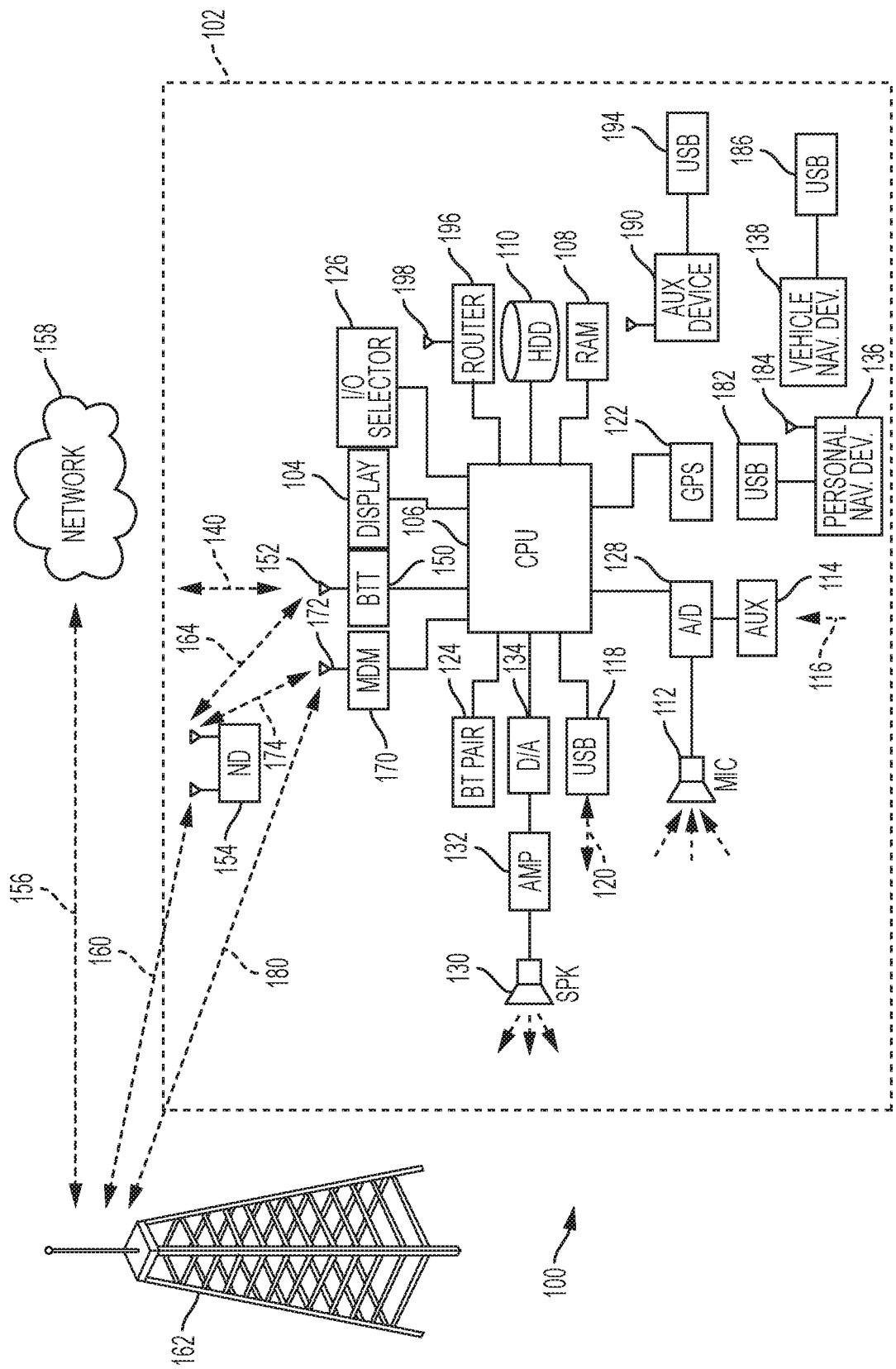
FIG. 1 is a block diagram illustrating a vehicle having a vehicle computing and telematics system for use in vehicle and ambient data collection of a vehicle sharing system or method according to a representative embodiment.

As required, detailed embodiments are disclosed herein; however, it is to be understood that the disclosed embodiments are merely representative and the claimed subject matter may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Due to the concern of vehicle maintenance, repairs, depreciation, insurance, and other costs, many vehicle owners hesitate to share their vehicles creating an obstacle to owner acceptance of new vehicle sharing ownership models or car sharing models. While the cost of "wear and tear" on a vehicle may be partially covered by a depreciation or mileage allocation, some types of "wear and tear" associated with a particular user or use may be very difficult to detect and allocate costs accordingly. As such, it is difficult for a vehicle owner to request fees from those sharing the vehicle for maintenance and repair items that may be associated more with one user than others, such as brakes, transmission, or timing belt, for example, without legitimate quantitative information to support the cost assessment.

Vehicle owners may be unaware of the particular use or the overall driving habits, routes, etc. of various vehicle users. In addition, it is difficult to calculate the cost associated with a particular use or user based on the contribution to wear and tear or risk score. Mileage or calendar time are often used to apportion fees related to fixed costs, such as insurance and depreciation, as well as variable costs, such as tire wear, oil/fluid life, brakes, etc. However, mileage or calendar time may not accurately reflect the actual maintenance or repair costs associated with particular uses, routes, or users.

Accurate analysis and assessment of vehicle maintenance and repair costs may encourage more vehicle owners to participate in vehicle sharing programs and more accurately allocate costs to the users in proportion to actual uses of the vehicle. As described in greater detail herein, vehicle sharing prices or charges may be based on real-time driving behaviors, routes driven, road/parking conditions, etc. The present disclosure recognizes that more accurate estimation or determination of "wear and tear" may be provided using sensors, networked vehicle computers, and a low cost connection to webservers on the internet. In addition, vehicles currently have many sensors whose outputs can be used to estimate "wear and tear" based on the individual driving behaviors of a vehicle sharing user. Additional sensors could be added to the vehicle and/or road infrastructure to capture additional data useful for real-time vehicle sharing cost/price determination as sensor technology continues to advance and sensor prices continue to decrease.

FIG. 1 illustrates an example block topology for a vehicle-based computing system 100 (VCS) for a vehicle 102 of a vehicle sharing system according to a representative embodiment. An example of such a vehicle-based computing system 100 is the SYNC system manufactured by THE FORD MOTOR COMPANY. A vehicle enabled with a vehicle-based computing system may contain a visual front end interface 104 located in the vehicle. The user may be able to interact with interface 104, for example, using a touch sensitive screen. In another illustrative embodiment, the interaction occurs through button presses or spoken dialog processed by automatic speech recognition and speech synthesis systems.

In the illustrative embodiment shown in FIG. 1, a processor 106 controls at least some portion of the operation of the vehicle-based computing system. Provided within the vehicle, the processor allows onboard processing of commands and routines. As described in greater detail below with reference to FIGS. 2-10, processor 106 may perform various calculations associated with determining real-time costs of vehicle wear and tear and display the costs to the user and/or communicate with a cloud-based network to provide data and receive costs associated with vehicle maintenance allocated to a particular use, user, route, weather, road condition etc. Further, the processor is connected to various types of computer program products implementing both temporary or non-persistent storage 108 and persistent storage 110. In this illustrative embodiment, the non-persistent or temporary storage is implemented by random access memory (RAM) and the persistent storage is implemented by a non-transitory computer program product or medium such as a hard disk drive (HDD), flash drive, or flash memory. In general, persistent (non-transitory) memory or storage can include all forms of memory or storage that maintain data when a computer or other device is powered down. This includes, but is not limited to, HDDs, CDs, DVDs, magnetic tapes, solid state drives, portable USB drives and any other suitable form of persistent memory.

The processor is also provided with a number of different inputs and outputs to facilitate user interaction with the processor and related devices. In this illustrative embodiment, a microphone 112, an auxiliary input 114 (for input 116), a USB interface 118 (for input/output 120), a GPS input 122, display screen 104, which may be a touchscreen display, and a BLUETOOTH pairing interface 124 are all provided. An input/output (I/O) selector 126 may be provided to facilitate user selection of a particular input/output for use. Input to both microphone 112 and auxiliary interface 114 may be converted from analog to digital signals by an associated A/D converter 128 before being communicated to the processor 106. Although not explicitly illustrated, vehicle components and auxiliary components in communication with the VCS may use a wired or wireless vehicle network (including, but not limited to, a CAN bus) to communicate signals representing data to and from the VCS (or components thereof).

System outputs may include, but are not limited to, a visual display 104 and speakers 130 or other stereo system output. Speakers 130 are connected to an amplifier 132 and receive signals from processor 106 through a digital-to-analog converter 134. Input and output signals may also be communicated via a remote BLUETOOTH device such as a personal navigation device (PND) 136, or a USB device, such as vehicle navigation device 138, along the bi-directional data streams generally represented at 140 and 120.

In one illustrative embodiment, system 100 uses a BLUETOOTH transceiver 150 to wirelessly communicate 152 with a mobile or nomadic device 154 (e.g., cell phone, smart phone, PDA, smart watch or any other device having wireless remote network connectivity). Nomadic device 154 can then be used to communicate 156 with a network 158 outside vehicle 102 through, for example, communication 160 with a satellite or cellular tower 162. In some embodiments, cellular tower 162 or a similar tower or antenna may function as a WiFi access point.

Nomadic device 154 may also be paired to vehicle 102 and communicate via BLUETOOTH or similar technology as represented by signal 164. Pairing of nomadic device 154 and BLUETOOTH transceiver 150 may be initiated by an associated button or interface 124, or similar input. Accordingly, CPU 106 pairs an onboard BLUETOOTH transceiver 152 with a BLUETOOTH transceiver in nomadic device 154.

Data may be communicated between CPU 106 and network 158 utilizing, for example, a data-plan, data over voice, or DTMF tones associated with nomadic device 154. Alternatively, it may be desirable to include an onboard modem 170 having antenna 172 for communication 174 of data between CPU 106 and network 158 over the voice band. Nomadic device 154 may then be used for communication 156 with network 158 outside vehicle 102 through, for example, communication 160 with cellular tower 162. In some embodiments, modem 172 may establish communication 180 with tower 162 to communicate with network 158. As one example, modem 172 may be a USB cellular modem and communication 180 may be cellular communication.

In one illustrative embodiment, processor 106 is provided with an operating system including an API to communicate with modem application software. The modem application software may access an embedded module or firmware of BLUETOOTH transceiver 152 to complete wireless communication with a remote BLUETOOTH transceiver, such as that found in nomadic device 154, for example. BLUETOOTH is a subset of IEEE 802 PAN (personal area network) protocols. IEEE 802 LAN (local area network) protocols include WiFi and have considerable cross-functionality with IEEE 802 PAN protocols. Both are suitable for wireless communication within a vehicle. Other communication technology may also be suitable for wired or wireless communications within the vehicle, such as free-space optical communication (IrDA, for example), non-standardized consumer infrared (IR) protocols, and the like.

In another embodiment, nomadic device 154 includes a modem for voice band or broadband data communication. In the data-over-voice embodiment, a technique known as frequency division multiplexing may be implemented allowing the owner of the nomadic device to talk over the device while data is being transferred. At other times, when the owner is not using the device, the data transfer can use the entire available bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), and Space-Domain Multiple Access (SDMA) for digital cellular communication. These are all ITU IMT-2000 (3G) compliant standards and offer data rates up to 2 Mbps for stationary or walking users and 385 kbps for users in a moving vehicle. 3G standards are now being replaced by IMT-Advanced (4G) which offers 100 Mbps for users in a vehicle and 1 Gbps for stationary users. In another embodiment, nomadic device 154 is replaced with a cellular communication device (not shown) that is installed in vehicle 102. In other embodiments, nomadic device 154 may be implemented by a wireless local area network (LAN) device capable of communication over, for example (and without limitation), an 802.11g network (i.e., WiFi) or a WiMax network, for example.

In one embodiment, incoming data can be passed through nomadic device 154 through onboard BLUETOOTH transceiver 150 to processor 106. In the case of certain temporary data, for example, the data can be stored on HDD 110 or mobile device or other storage media until such time as the data is no longer needed. Temporary data may include various sensor data collected for a particular user, trip, route, etc. that may be communicated to one or more cloud-based services for use in determining maintenance, repair, and/or wear and tear costs for use by the vehicle sharing system for the current use or future uses by associating the data with a particular driver or user. The temporary data may then be deleted or overwritten after communication to other computers within the network.

As previously described, various devices may interface with VCS 100, such as personal navigation device 136, having a USB connection 182 and/or an antenna 184, vehicle navigation device 138 having a USB connection 186 or other connection, onboard GPS device 122, or remote navigation system (not shown) having connectivity to network 158. As used herein, USB generally represents any of a variety of serial networking protocols that may include IEEE 1394 protocols referred to as FireWire™ (Apple), i.LINK™ (Sony), and Lynx™ (Texas Instruments), EIA (Electronics Industry Association) serial protocols, IEEE 1284 (Centronics Port), S/PDIF (Sony/Philips Digital Interconnect Format) and USB-IF (USB Implementers Forum), which form the backbone of the device-device serial standards. Most of the protocols can be implemented for either electrical or optical communication.

As also shown in FIG. 1, processor 106 may communicate with various other types of auxiliary devices 190. These devices may be connected through a wireless connection/antenna 192 and/or a wired connection 194. Auxiliary devices 190 may include, but are not limited to, personal media players, wireless health devices, portable computers, and the like. Processor 106 may also be connected to a vehicle based wireless router 196, using for example a WiFi (IEEE 803.11) transceiver 198. This could allow processor 106 to connect to remote networks in range of vehicle based wireless router 196. As described in greater detail with reference to FIGS. 2, 3, 7, 8, and 9, processor 106 may communicate with other vehicles and infrastructure over various types of static and dynamic or ad-hoc networks that use various types of wired and wireless technology to transmit sensor data associated with a particular vehicle use, route, weather, road condition, etc. and to receive cost or price information allocated to the actual use of the vehicle.

In one embodiment, vehicle computing system 100 utilizes processor 106 and associated temporary and persistent memory RAM 108 and HDD 110, respectively to track and report allocated maintenance, mileages or repair costs associated with a particular vehicle trip. Display 104 may be used in combination with one or more inputs and outputs, such as microphone 112, speaker 130, and/or nomadic device 154 functioning as a vehicle human-machine interface (HMI). Vehicle processor 106 is coupled to the HMI and programmed to store, in persistent memory 110, trip information from one or more vehicle sensors for use in determine vehicle sharing costs. The current actual or estimated cost for a particular trip or rental period may be displayed by the HMI. The HMI could also display the estimated costs for a particular trip and furthermore if drivers improve their driving behavior during the trip, the costs saved could also be displayed by the HMI. The costs saved could also be presented as an incentive or coupon for next time car-sharing usage. Similarly, various services may be suggested or offered to the vehicle owner using the HMI, such as an extended maintenance plan, or maintenance services based on the current or recent vehicle use. In one embodiment, real-time vehicle sharing cost information is output to display 104.

As previously described, system 100 may include a wireless transceiver, such as BLUETOOTH transceiver 152, modem 170, or router 196, for example, in communication with vehicle processor 106 with vehicle processor 106 further programmed to obtain information from a remote database that may be stored on network 158, for example, using the wireless transceiver in response to detecting a particular vehicle location or route, for example. Vehicle processor 106 may be further programmed to communicate vehicle GPS coordinates from GPS module 122 using one or more wireless transceivers 152, 170, 196 to obtain trip-related information that may affect the vehicle sharing cost determination such as weather, road conditions, construction information, etc. In one embodiment, vehicle processor 106 is further programmed to communicate vehicle sharing cost information or reminders or alternative cost-saving routes using a connected mobile device, such as nomadic device 154 and/or a remote server accessible via remote network 158.

Figure 2:
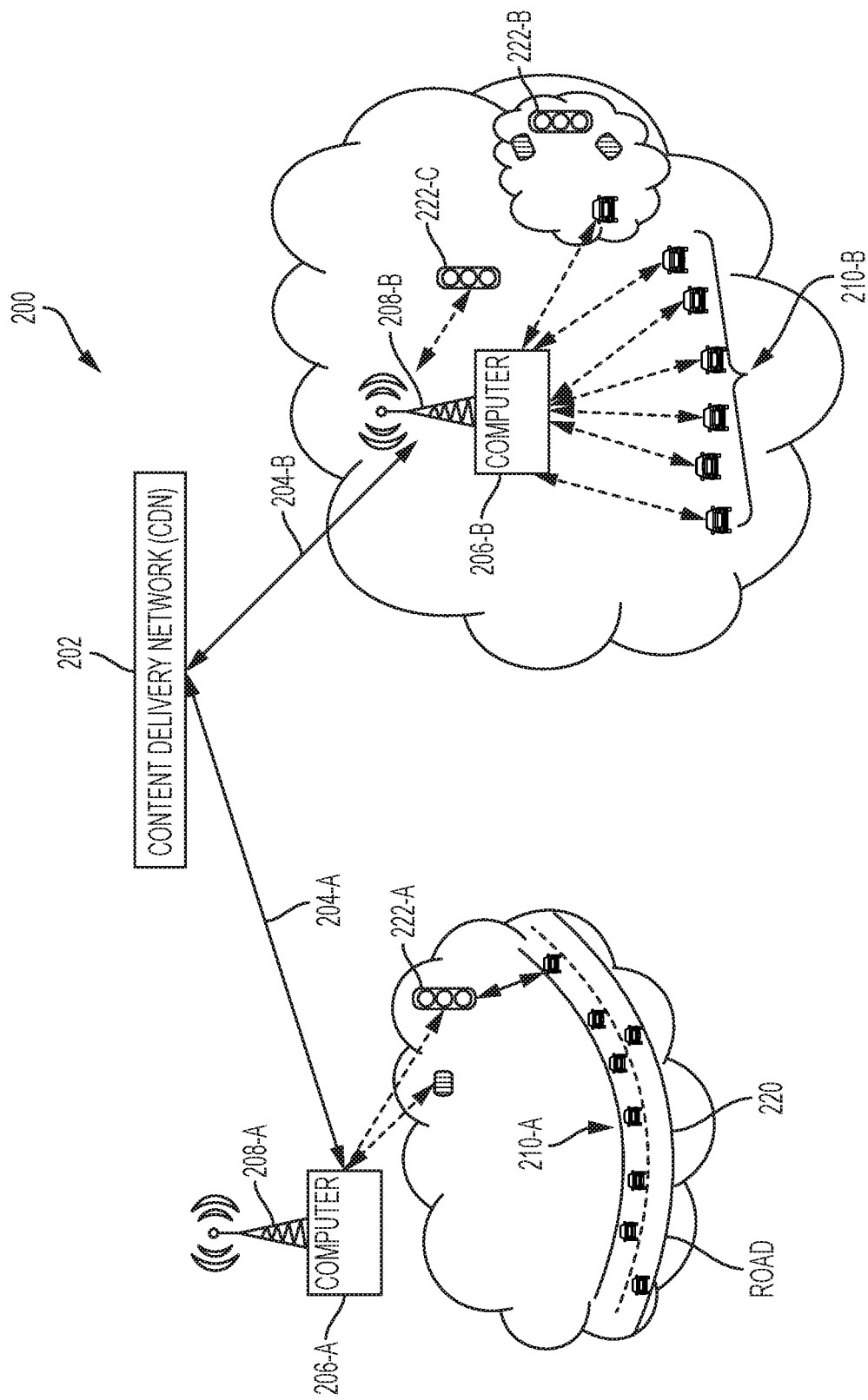
FIG. 2 is a graphical depiction of a vehicle sharing system topology having ad-hoc heterogeneous parallel computing networks including vehicles, cell towers, traffic infrastructure and the like within a content delivery network (CDN) of a representative embodiment.

FIG. 2 is a graphical depiction of a vehicle sharing system topology having ad-hoc parallel computing networks including vehicles, cell towers, traffic infrastructure and the like cooperating with a content delivery network (CDN) of a representative embodiment. System 200 includes a CDN 202 that may be connected by one or more stationary or wired networks 204-A, 204-B, to computers 206-A, 206-B functioning as repetition servers transmitting and receiving signals from associated cell towers 208-A, 208-B. Vehicles 210-A, 210-B may form ad-hoc parallel computing systems that change dynamically as the distance between the vehicles and cell towers changes. The vehicle computing system (VCS) of one or more vehicles 210-A, 210-B may record information from various vehicle sensors for use in determining maintenance and wear and tear on the vehicles. Data may be collected from vehicles that are actively participating in a vehicle sharing program as well as vehicles that are not participating in such a program. Data from non-participating vehicles may be used to gather general data that may apply to other vehicles traveling along the same road 220 or within a particular region at a particular time, such as weather data, for example. More specific data related to a particular vehicle may be collected from vehicles 210-A, 210-B participating in a vehicle sharing program to provide vehicle sharing cost or pricing based on data for a particular vehicle, route, time, etc.

The ad-hoc parallel networks may include vehicle to vehicle communications, vehicle to infrastructure 222-A, 222-B, 222-C communications and communications with embedded computers and repetition servers represented by computers 206-A and 206-B via cell towers 208-A, 208-B of CDN 202. In general, the VCS tends to have relatively low computation power, but excellent real-time performance. As such, vehicles 210-A may relay collected sensor data from vehicle to vehicle, and then to CDN 202 via infrastructure 222-A, repetition server/computer 206-A, and cell tower 208-A for processing in the cloud by webservers having more significant data storage and processing capabilities for more thorough analysis. Alternatively, or in combination, vehicles 210-B may each relay collected data to CDN 202 through associated cell towers 208-B and repetition server/computer 206-B. Data may be shared using any of a number of mobile middleware technologies, such as JAVA/JINI, LIME, or LINDA, for example. Damage models that compute the cost of different events from the vehicle network signals may run in one or more processors of the VCS for improved access to input data, or in the cloud under Hadoop control, for example, for greater processing power. In various embodiments, processing of the vehicle sensor data produces results that are initially maintained within the CDN 202, but may migrate to other networks for analytics. Data may be managed in the CDN 202 by various data management products, such as Apache Torque, for example.

As explained in greater detail herein, data collected by the VCS of participating and non-participating vehicles and driver's profiles can be moved into the cloud and with much of the analysis done automatically to determine vehicle sharing costs/prices. Webservers can be used to disseminate the analysis to data consumers including vehicle sharing owners, insurance companies, advertisers, service facilities, etc. The historical data of one user's driving behavior can be collected and analyzed to determine past or future pricing for that user. Similarly, historical data can be used to detect and rank different types of vehicle use, such as towing a trailer, expressway driving, driving at high altitude, or driving through shallow water, etc. Likewise, the vehicle sensors may be used to detect weather and road conditions, such as salt on the roads, hail, dust, sand, fog, wildfire, etc. Based on the data collected and real-time and/or historical analysis, the vehicle-sharing charges can be dynamically determined for each user, use, route, etc. This may result in a user being charged for more wear and tear based on driving the vehicle on rough roads or in inclement weather relative to driving on a smooth highway on a sunny day. Charges based on actual individual and aggregated vehicle data may be used to reduce the concerns of vehicle lenders relative to maintenance expenses and potential damage that is otherwise difficult to detect and accurately price into the vehicle sharing or rental charge.

Figure 3:
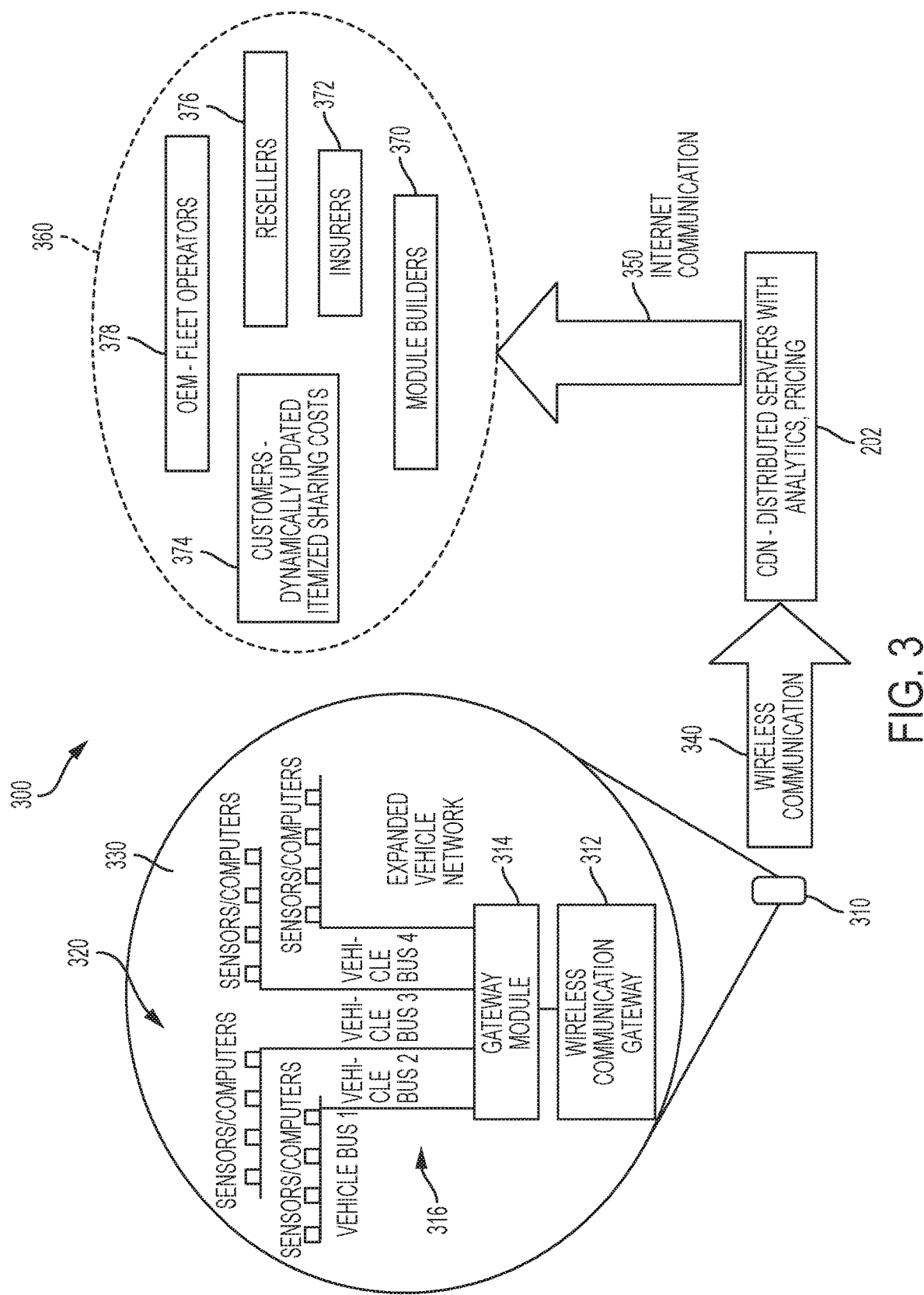
FIG. 3 is a diagram illustrating a communication among vehicle components and vehicles in a vehicle sharing system, a CDN, and end users of vehicle sharing data according to a representative embodiment.

Referring now to FIG. 3, a block diagram illustrates communication among vehicle components and vehicles in a vehicle sharing system including a CDN, and end users of vehicle sharing data according to a representative embodiment. System 300 includes vehicles 310 that include an expanded vehicle network, generally represented by reference numeral 330, that may include a wireless communication gateway 312 and gateway module 314 coupled to one or more vehicle buses 316 to collect data from vehicle sensors/computers 320 for use in vehicle sharing cost determination and pricing. Vehicles 310 may communicate raw or processed data collected from sensors/computers 320 over various wireless communication channels 340 to the CDN 202 that provides distributed servers with data analytics and vehicle sharing pricing based on actual use of a particular vehicle and/or aggregated data from multiple vehicles. The CDN 202 may utilize internet communication 350 to exchange data collected from vehicle sensors/computers 320 with end users 360, which may include model builders 370, insurers 372, vehicle sharing customers/users 374, vehicle/data resellers 376, and OEM/fleet operators 378, for example.

Model builders 370 may use the data from vehicle sensors/computers 320 to build and calibrate maintenance models and associated pricing models based on the sensor data. Insurers 372 receive data reflecting actual use of vehicles that may be used to determine the current status/condition of insured vehicles, and for pricing of policies based on actual vehicle uses. Insurers 372 may benefit from more accurate forecasts of expected payouts on each insurance policy, which contributes to the success of any insurance plan such as the extended service plans offered by vehicle OEMs. If a vehicle will be shared with others, the extended service plans (ESPs) could be priced accordingly or provided based on actuarial information. The vehicle infotainment system or HMI may be used to send ESP advertisements or recommendations to targeted customers, such as vehicle-sharing lenders and users based on the data from vehicle sensors/computers 320. Using connected vehicle technology, the system can obtain data used to qualify both driver and vehicle components on the basis of individual risk or population risk using data mining with hybrid physics-statistical models.

Vehicle sharing customers/users 374 may receive dynamically updated itemized sharing costs during use or at the conclusion of a particular use. Data may be communicated to the vehicle 310 and to the user through a vehicle HMI, for example, or a connected mobile device. As such, the customer/user 374 may receive near real-time information (such as hour-by-hour, for example) of costs/charges associated with the vehicle use so that the customer/user is not surprised or blind-sided by the cost for a particular trip or use. Resellers 376 may use the collected sensor data to develop strategies for optimal resale of a vehicle based on actual previous use. OEM/fleet operators 378 can use the sensor data to analyze use and performance of vehicles by segment to better understand actual customer use and related costs associated with maintenance and/or repairs associated with a particular use, route, driver behavior, etc.

As generally illustrated in the Figures and described in greater detail herein, the integration of vehicle sensors/computers 320, drivers, and cloud components 360 provides a unique way to collect and utilize both vehicle data and personal data. Vehicle manufacturers do not need to rely on a dedicated device plugged-in to selected vehicles. Rather, vehicles already collect sensor data such as location, velocity, acceleration, sound, temperature, road gradient, brake torque, propulsive torque suspension travel engine coolant and oil temperature, parking location, etc. The VCS may be configured or programmed to extract features from the data using sampling techniques such as filtering and integral transforms, and extract road conditions and parking features such as dirt road, pothole, bottom out, suspension overload, weather, hours parked outside etc. when the computational intensity of the VCS is low. Higher computational intensity calculations can be done by computers of different sizes in the CDN 202. Features and sensor data may be located and time stamped using data from the positioning system with analytics applied to determine vehicle and/or ambient conditions and use. The data collection by vehicle sensors and analysis used for the associated real-time payment calculation can be partially or entirely performed by the VCS or partially or entirely transferred into the cloud-based web services through a thin network connection, such as a cellular data plan. Some data can be aggregated in a multi-dimensional histogram and summed periodically in non-volatile memory storage on the vehicle. When the vehicle has available communication network access and computing availability, the data may be synchronized with web services either through a mobile device or a telematics control unit, for example, as previously described.

Figure 4:
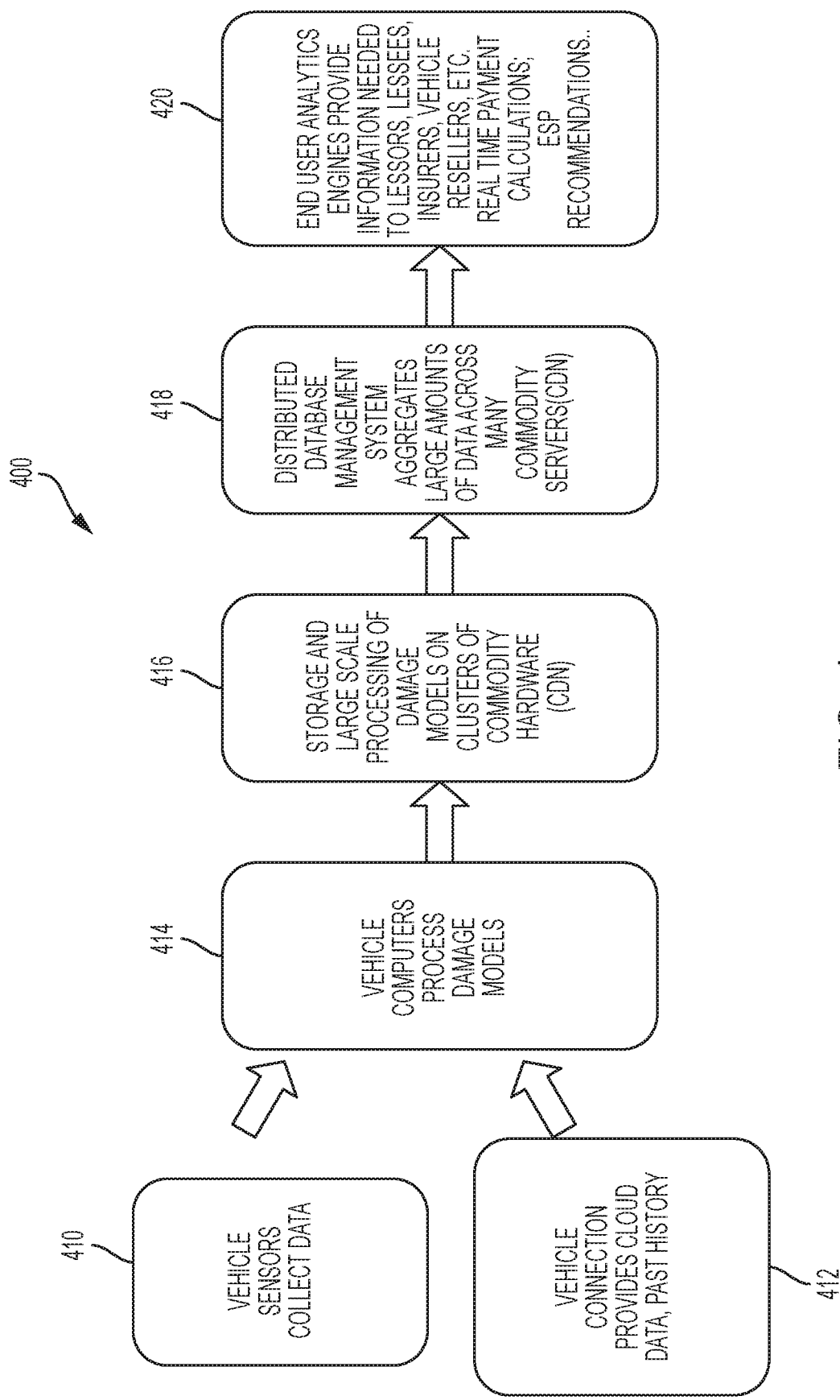
FIG. 4 is a flowchart illustrating operation of a system or method for vehicle sharing with data flow and utilization of a representative embodiment.

Referring now to FIG. 4, a flowchart illustrating operation of a system or method for vehicle sharing with data flow and utilization of a representative embodiment is generally represented by reference numeral 400. Vehicle sensors collect data associated with vehicle and/or ambient operating conditions as represented at 410. One or more wireless connections may be used to transmit and receive data from the cloud as represented at 412. Cloud data may include past history for a particular vehicle, driver, route, etc. The VCS may include one or more vehicle computers having processors programmed or configured to process the sensor data using damage or wear and tear models as represented at 414. Storage and large scale processing of damage models may be performed in the cloud by the CDN on clusters of commodity computing hardware using sensor data in addition to cost information for replacement parts, repairs, and labor, for example, as represented at 416. A cloud-based distributed database management system aggregates large amounts of data across many commodity servers of the CDN as represented at 418. End user analytics engines may be used to provide information to lessors, lessees, insurers, vehicle resellers, vehicle-sharing operators and vehicle-sharing companies etc. along with real-time cost, price, and/or payment information and extended service plan (ESP) recommendations based on the analytics as represented at 420.

As a representative example illustrating operation of the system or method for vehicle sharing cost/price determination according to various embodiments, a vehicle may include an antilock braking system (ABS) module that receives analog signals from sensors and processes them to control the brakes when the brake pedal is pushed or when requested to apply a braking torque by other systems on the vehicle network. The ABS module also provides information from its sensors to other modules within the vehicle extended vehicle network. For example, for each wheel rotation each wheel position sensor sends a number of analog pulses to the ABS module, which it counts and periodically sends a message with the amount of wheel rotation that has taken place since the last message. The instrument panel adds the wheel rotations to calculate the odometer measurement. The odometer value may be used for component wear estimates that are based on distance driven. A gateway module such as the Accessory Protocol Interface Module (APIM), also known as SYNC, may collect specific data from network ECUs and transfer it to an app running on a mobile device where it is stored and processed, and at the appropriate time uploaded to the cloud based CDN.

After the estimation of the wear and tear associated with a particular use, route, driver, etc. the user may be charged accordingly for the trip taken. Alternatively, or in combination, future charges for the use, route, driver, etc. may be based on the associated historical data. The vehicle-sharing fee can be dynamically calculated by the cloud-based CDN and communicated to the vehicle HMI or a connected mobile device. The vehicle-sharing operators may use the data to determine whether or not to rent a vehicle for a particular use, route, driver, etc. or may price the transaction based on the risk level score associated with the particular use, route, driver, etc. The sensor or the models may also trigger an alert that is sent to the lenders to perform some maintenance work related to specific or accumulated wear and tear. One or more extended service plans may also be priced accordingly and offered or recommended to the vehicle owner/lender.

Based on some existing damage model, car-sharing operators could use the input data from the vehicle or customer driving behaviors to identify the damage costs. One function of the wear and tear or damage models generally represented at 414 is to classify various incidents or historical behaviors into several pre-specified event groups so that the cost estimation is easier and more efficient based on a limited or reduced number of event groups. Based on collected characteristics of events, a machine learning method, such as a support vector machine may be used to classify the events according to:

$$\min|\beta|, \text{ subject to } \begin{cases} y_i(x_i^T \beta + \beta_0) \geq 1 - \epsilon_i \\ \epsilon_i \geq 0, \sum \epsilon_i \leq \text{constant} \end{cases},$$

where $x_i$ and $y_i$ respectively represent event characteristics and event groups. Alternatively, cluster methods may be used, or any of a number of methods published in the literature. The models may also include a reliability component.

For wear and tear or damage that may be related to time rather than distance, (e.g. exposure of paint to sunlight) x may represent time rather than distance. Further, damage models may be based on mixed inputs such as distance and time, or time and light intensity, or historical driving behaviors or any other vehicle or environment data depending on the particular implementation.

In one example, the rate of damage ($D_{rm}$) may take the form of a Weibull cumulative distribution, or more generally a log-normal distribution function, where miles driven on a road or route having a condition x is determined according to:

$$D_{rm} = 1 - e^{-(x/\lambda)^k}$$

where $\lambda$ and $\kappa$ are determined by regression using repair histories or claim histories and auction prices of many vehicles for which data has been collected in the cloud. The extra charge to the customer/user may then be determined according to:

$$\text{Charge} = D_{rm} * x$$

Other methods or calculations for determining a cost associated with a vehicle use, route, user, etc. based on vehicle sensor data may be used in place of, or in combination with those described above, which are provided only as an example to illustrate a particular embodiment.

Figure 5:
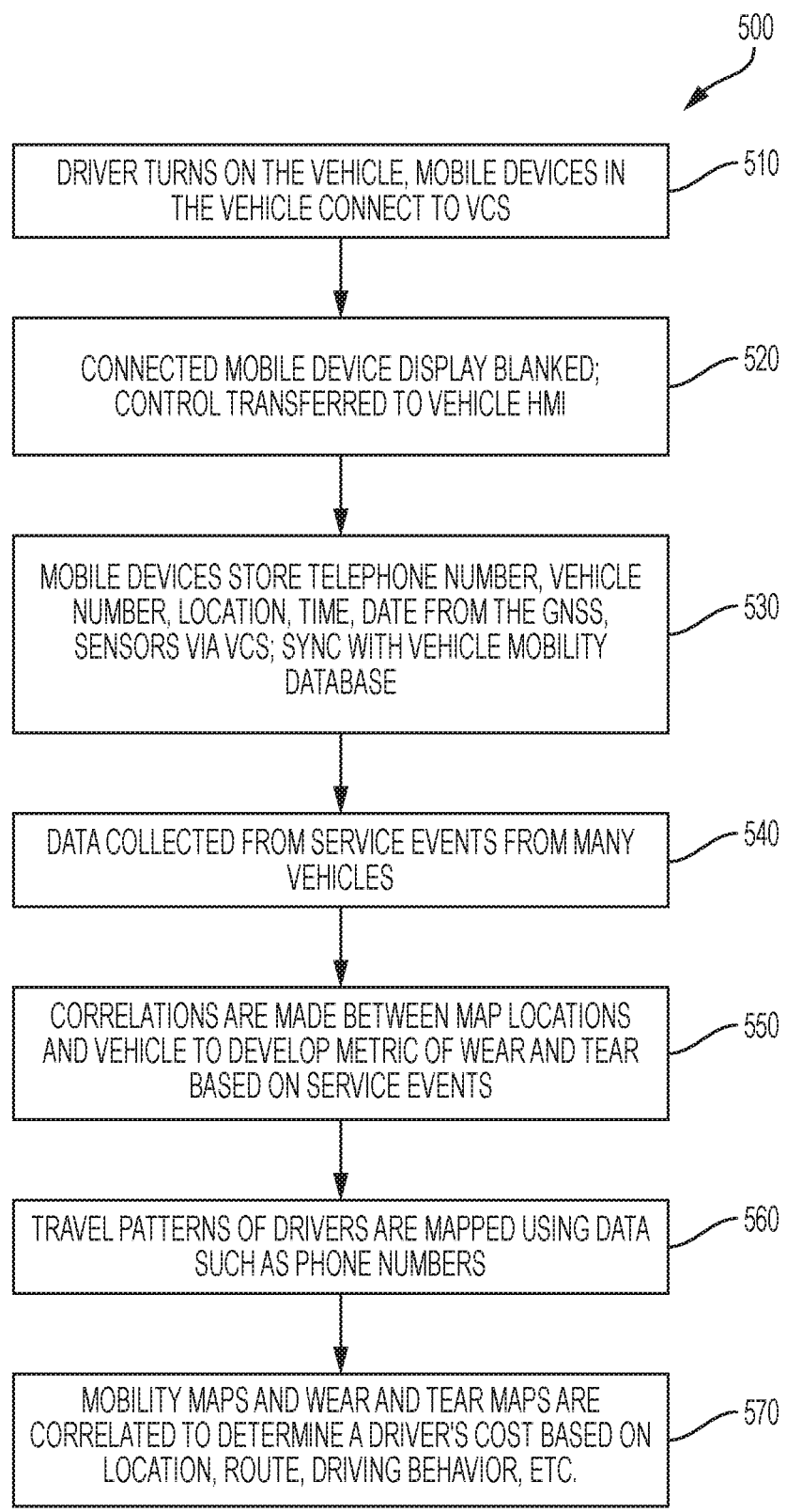
FIG. 5 is a flowchart illustrating representative data collection from mobile devices of a vehicle sharing system according to one embodiment.

FIG. 5 is a flowchart illustrating representative data collection from mobile devices of a vehicle sharing system according to one embodiment. As previously described, a mobile or nomadic device, such as a smartphone, watch, or other wearable device may be used to collect data for analysis and processing in detecting vehicle and/or ambient conditions that may affect vehicle wear and tear. The mobile device may be linked or paired to the vehicle through the VCS, or may otherwise be registered with the vehicle sharing network and associated with a particular vehicle, use, route, etc. to detect and communicate vehicle and/or ambient conditions, such as vehicle position, ambient temperature, vehicle speed/acceleration, and the like.

Operation of a system or method as represented by flowchart 500 may include linking or pairing of a mobile or nomadic device to the vehicle at vehicle key-on as represented at 510. Unpaired devices may also be detected within the vehicle without specific pairing or linking operations being performed. The connected mobile device may transfer control through an associated app to the vehicle HMI as represented at 520. Alternatively, a corresponding app may be used to provide various vehicle input/output functions via a user interface of the connected mobile or nomadic device.

As generally represented at 530, one or more connected mobile devices may include local persistent memory for storing a telephone number, vehicle number, time/date, etc., some of which may be obtained from a global navigation satellite system (GNSS), for example. Other data may be communicated to or through the connected mobile device for synchronization with a vehicle mobility database. This may occur in various phases or stages as different networking connections are available to the vehicle and/or mobile device. For example, the mobile device may sync first with a desktop computer with the computer connecting to the mobility database.

During operation of the vehicle, data is collected from vehicle sensors and associated with corresponding service events for the vehicle as represented at 540. Data may be aggregated across many vehicles and uses to analyze service events and associate costs for a particular type of vehicle use, driver behavior, route, weather, etc. Users may use multiple vehicles over time with different uses, routes, etc. with the historical data used in determining the cost for future vehicle sharing transactions. Correlations are made between map locations and the vehicle to develop the metric used for wear and tear costs based on previous and/or anticipated actual service events as represented at 550. Travel patterns for drivers are then mapped using data such as phone numbers as represented at 560. Mobility maps and wear and tear maps for individual drivers are correlated to determine cost associated with a particular driver based on location, route, driving behavior, etc. as represented at 570.

Figure 6:
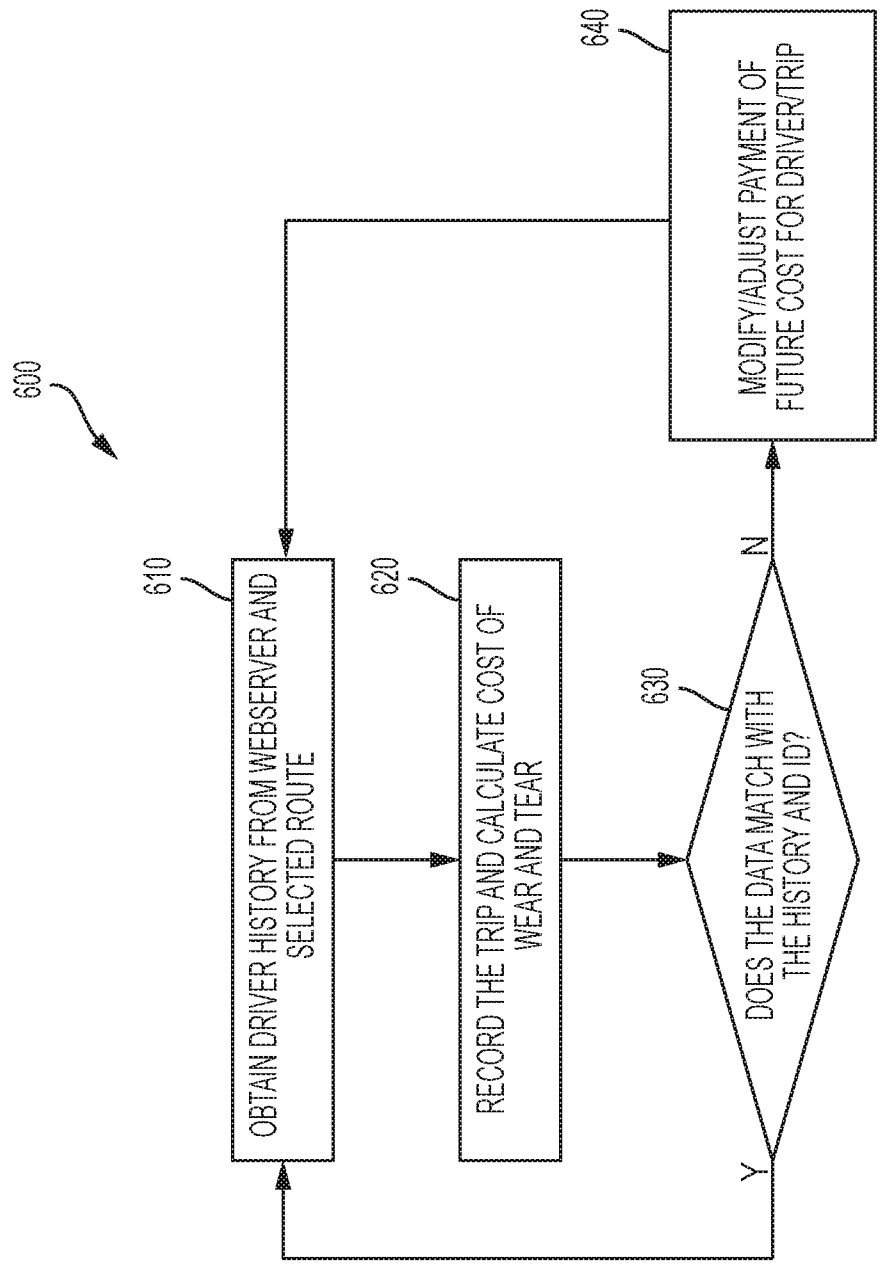
FIG. 6 is a flow chart illustrating use of a webserver or cloud-based network to identify historical travel patterns for use and other data sources, such as customer demographical information in determining driver's risk score and costing/pricing in a vehicle sharing system or method of a representative embodiment.

FIG. 6 is a flow chart illustrating use of a webserver or cloud-based network to identify historical travel patterns for use in determining costing/pricing in a vehicle sharing system or method of a representative embodiment. Operation of a system or method for vehicle sharing as represented by flowchart 600 may include obtaining driver history from a cloud-based network or webserver for a particular selected route and/or vehicle use as represented at 610. The vehicle sensors and/or associated or linked mobile devices are used to record the trip with an associated cost of wear and tear calculated based on the actual sensor data as represented at 620. At block 630, the system or method may determine whether the current trip data is consistent with the historical data for similar trips and/or a particular driver. The previously calculated or estimated trip cost may be modified or adjusted based on the collected data if the current trip does not match the historical data as represented at 640. Alternatively, current trip data may be used to modify or adjust the price for future trips having similar characteristics as the current trip. If the current trip matches, correlates, or is otherwise consistent with the historical data for the driver, route, use etc., then the previously determined estimate or price may be used in assessing the trip cost.

Figure 7:
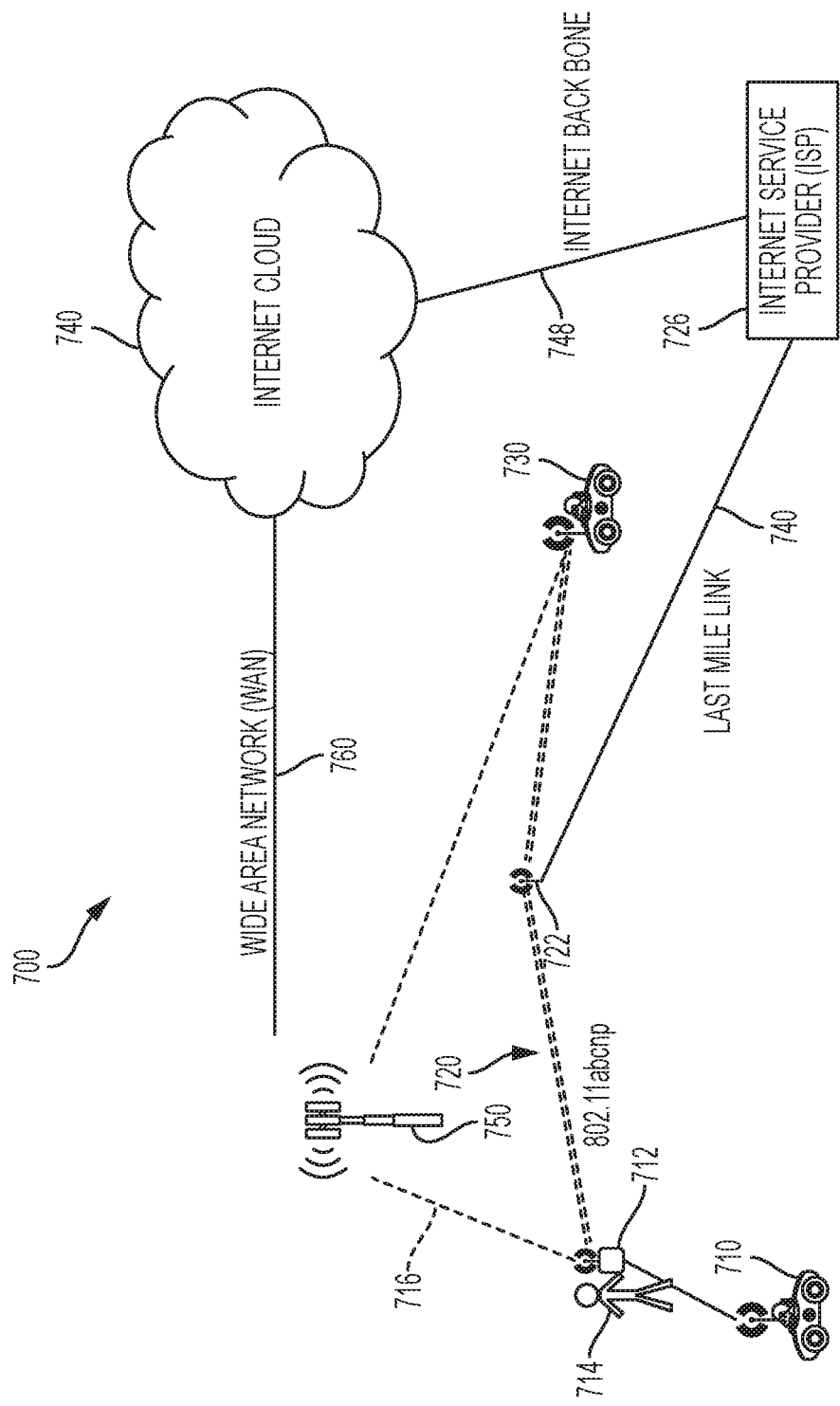
FIG. 7 illustrates a hybrid network for collecting vehicle data and providing data-based pricing to users of a vehicle sharing system or method according to an embodiment.

FIG. 7 illustrates a hybrid network for collecting vehicle data and providing data-based pricing to users of a vehicle sharing system or method according to an embodiment. System or method 700 may include a vehicle 710 that collects sensor data and communicates data with and/or through an associated mobile device 712 of a user 714 over one or more wireless links 716, 720, 732, and wired links represented by last mile link 740, internet backbone 748, and wide area network (WAN) link 760. Various access points or relays may be used to communicate data from vehicle 710 to the internet cloud 740, such as WiFi access pint 722, cell tower 750, and internet service provider (ISP) 726. The hybrid network of system or method 700 connects distributed data processing and storage of the cloud 740 with the vehicle 710 and user 714 (or owner). Each component of the hybrid network may have an associated known position or location. A discovery and messaging system, such as Web Intents for example, makes it possible for each device to advertise a service set and for that service set to be discovered by other devices. Once discovered, each device offers a home location anonymously. Mobility data may be collected and stored on each device and relayed to cloud 740 to calculate the real-time payments and inform the owners or operators.

Figure 8:
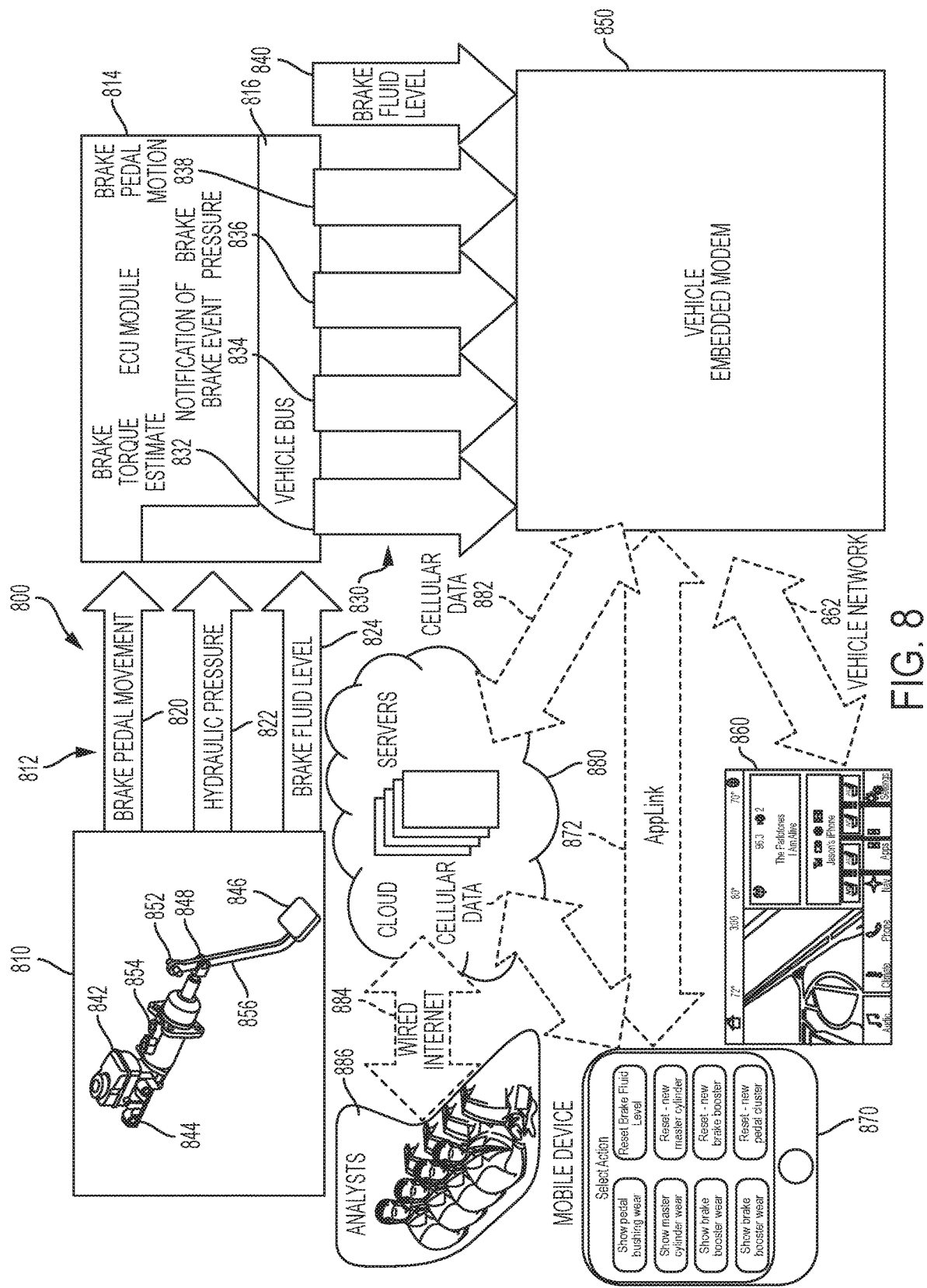
FIG. 8 is a block diagram illustrating representative operation of a vehicle sharing system or method having cloud-based data analysis and data-based pricing according to a representative embodiment.

FIG. 8 is a block diagram illustrating representative operation of a vehicle sharing system or method having cloud-based data analysis and data-based pricing according to a representative embodiment. A vehicle system or subsystem 810, represented by a braking system in this example, communications via sensor signals 812 with a vehicle computer or electronic control unit (ECU) 814. One or more sensor signals 812 may communicate by direct wired connection with ECU module 814, or indirectly over the vehicle bus 816 (which may also be considered part of the vehicle network 862). The vehicle may include a number of ECU modules 814 each having a processor and associated memory as previously described. In the representative example illustrated, ECU module 814 represents an antilock braking system (ABS) control module.

ECU module 814 communicates data or parameter values 830 based on sensor signals 812 (and various other sensor signals) using a messaging or data transfer protocol to a vehicle embedded modem 850, which may be used to communicate data to an HMI 860 over the vehicle network 862, a linked mobile device 870 over an AppLink connection 872, and/or cloud servers 880 over cellular communication connection or link 882. Cloud servers 880 may communicate data over a wired internet connection 884 to various analysts 886.

Braking system 810 includes a fluid reservoir 842 with a fluid level sensor or switch. Low brake fluid level, which may be detected by the fluid level sensor or switch may accelerate brake wear and contribute to additional maintenance/repair costs that may be accounted for by the cloud-based or VCS-based models based on the sensor data. Braking system 810 also includes a master cylinder 844 with a pressure sensor that may be used to detect high or low hydraulic pressure. High pressure resulting from overfilling of reservoir 842, for example, may lead to premature seal wear or other conditions associated with maintenance/repair costs. Brake system 810 may include various other components that require periodic inspection, maintenance, or repair depending on the particular use, route, driver behavior, etc. such as bushing wear surfaces 848, 852, a brake booster 854, and a brake light switch in contact with pedal arm 856 activated when the driver actuates the brake pedal 846, for example.

Brake system 810 may communicate analog and/or digital signals to ECU module 814 directly and/or over vehicle bus 816 as previously described. Sensor signals or data may include signals or data corresponding to brake pedal movement 820, hydraulic pressure 822, and brake fluid level 824, for example. Analog signals may be processed by ECU module 814 and corresponding data or parameter values communicated over the vehicle bus 816 along with other vehicle operating parameter values as represented by data 830, which may include an estimated braking torque 832, a flag or notification of a brake event, diagnostic code, or status 834, brake pressure 836, brake pedal motion 838, and brake fluid level 840, for example. Other components and sensors may also be including in the braking system 810, such as brake pad wear sensors, brake temperature sensors, etc.

In a representative operating scenario, the brake pressure sensor of master cylinder 844 measures the pressure and duration of each braking event and communicates data to the ECU module 814 for temporary storage. A brake temperature sensor measures the heat produced during braking. A GPS clock determines when and where a braking event occurs based on notification 834. ECU module 814 may store the ambient temperature, barometric pressure, humidity, rain, and similar information received over vehicle network 862 and associated with a particular braking event. The antilock braking system 810 reports when ABS control is triggered indicating a low traction or hard braking event. Wheel height or suspension sensors may also provide date to determine the vehicle weight and weight shift during braking. A brake performance model can then use the data collected by the vehicle sensors to estimate the amount of brake pad and rotor (or drum and lining for drum brakes) wear for each braking event. The events may be logged by the VCS and the wear of brake components estimated with a corresponding price determined for the particular vehicle use or trip.

According to various embodiments of the present disclosure, wear and tear and associated costs can be estimated or determined directly by corresponding sensor signals on specific components, such as brake pad wear sensors, or by training neural network or wear models based on the physics and statistics of vehicle operating events by monitoring vehicle conditions, periodically measuring wear, and inputting the data into a cloud-based web service that can estimate the parameters using known statistical approaches. Components or systems may be selected for monitoring and modeling based on types and costs of maintenance and repairs. As previously described, some components may have wear and tear monitored based on odometer distance, time, speed or a combination of the two. Some components may function normally, then fail suddenly such as an engine low on oil, while other components wear gradually and predictably, such as tire treads. The wear and tear models used to determine vehicle sharing cost may be adjusted accordingly based on the type of component and types of wear associated with particular vehicle operation.

FIG. 8 illustrates one of many possible examples of wear and tear that would be difficult to detect and price without the use of vehicle sensor data incorporated into a vehicle sharing system according to various embodiments of the present disclosure. Other examples of system or component wear and tear that can be detected and priced accordingly may include using sensor data to determine the road condition and/or parking condition of a vehicle in combination with the information of driving behavior. The system could predict the vehicle condition and related vehicle residual value that is influenced by the vehicle condition, and identify the related charges to a vehicle sharing user. The system could provide more accurate prediction of vehicle physical condition than currently available systems, which impacts the vehicle residual value, and may be used to determine the vehicle sharing charges.

In another example, vehicles having an electronic stability control may use signals from accelerometers associated with the electronic stability control and restraint control modules to detect sudden shocks such as hitting a pothole or a curb that can damage a vehicle and reduce expected life of various components that may not be apparent by simple observation or visual inspection.

Similarly, any unusual, non-mileage related tire wear can be estimated from various vehicle sensor inputs. Wheel torque sensors and longitudinal, lateral and yaw acceleration sensors may be used in a model to determine the force vectors acting on each of the four wheels. Road map databases containing information about road construction or condition relevant to tire wear, as well as weather information sensors and weather reports from the internet may be used to provide information about ambient conditions. These inputs are provided to a tire wear model that may estimate tread life and project the total wear for a particular trip and/or use of the vehicle.

As another example, timing belt life can be estimated from the factors that influence timing belt wear such as starting the engine when the belt is cold, engine acceleration, and/or belt contamination with oil or coolant. Contamination with coolant is difficult to detect without a special sensor, but can be suspected if engine oil drops continuously between oil changes and top-ups. A significant contributing factor to timing belt wear is quickly accelerating the engine (which loads the belt) to high speed (which flexes the belt more quickly) while the belt is cold (and therefore inflexible). The belt gets cold when the ambient temperature is low, which may be detected by the ambient temperature sensor used for climate control and engine calibration, for example. The speed of the engine is detected by the engine tachometer and the acceleration of the engine by the time derivative of the engine speed. These inputs can be used to estimate timing belt wear and associated maintenance/repair cost attributed to a particular vehicle use or trip.

Vehicle sharing cost may also include monitoring of components such as the engine bearings. Engine bearing life can be greatly reduced by loss of oil pressure, especially when the bearings are cold or operating under high torque. Vehicles generally include data messages broadcast on the vehicle network or bus for the oil pressure sensor and an estimate of engine torque. These signals or parameter values can be used as inputs to a bearing wear model that can detect low oil pressure events and estimate any additional wear and associated maintenance/repair costs for use by the vehicle sharing pricing.

Vehicles that have been flooded may have permanent damage that may be difficult to detect by visual inspection or latent damage that may manifest in costly repairs at some later date. For example, low voltage devices such as sensors and computers that have been immersed in water may begin a long process of deterioration and corrosion that ultimately affects electrical connections and may cause intermittent or permanent operating faults. Water may enter the engine intake and flood the cylinders resulting in rusting and bending of engine components. Water mixed with engine or transmission oil will reduce the life of those components. Water sensors can be easily installed in locations such as wheel speed sensors that will detect the presence of flooding that does not cause catastrophic damage requiring repair, but does cause long term degradation of mechanical parts and electronics. This vehicle sensor data may be used by the vehicle sharing system to allocate the detected wear and tear and/or anticipated future maintenance and repairs associated with a particular trip or use.

As previously described, the engine control computer gathers input from many sensors in the engine, transmission, and exhaust system that it uses to determine the type of fuel being used in the engine and its properties for engine calibration and operation. For example, when the engine is run on E85 (fuel containing 85% ethanol) the calibration is considerably different than when the engine runs on more conventional gasoline blends. By determining the type of fuel and associated properties, engine parameters such as spark advance and air-fuel mixture can be adjusted to achieve fuel economy and emissions targets. The type of fuel used may also influence component life and maintenance intervals depending on ambient and driving conditions. This data can be collected from the vehicle bus and input into an engine life model to estimate wear and tear on the engine.

A still further example of vehicle sensor data that may be used to detect and price wear and tear includes vehicle transmission data. Transmission damage may occur from aggressive or abusive shifting between reverse gear and forward gear without coming to a complete stop. Users may perform this maneuver when rocking of the vehicle to get out of snow or mud, or from carelessness when backing out of parking spaces, for example. These maneuvers may reduce the life of transmission components by increasing band wear and fatiguing various transmission parts. These maneuvers can be detected by monitoring the shift selector or PRNDL, wheel speed, and/or engine speed of the vehicle to detect whether the wheels have stopped before the switching the shift selector or that the engine speed is at or near idle speed, for example. These events can be logged with subsequent analysis to determine whether the events fall within normal wear and tear or whether they are considered excessive or abusive with vehicle sharing charges assessed accordingly.

In another example, engine speed may be monitored to determine vehicle wear and tear in a vehicle sharing payment calculation. Most vehicles have engine protection that prevents the driver from exceeding the engine "red-line" RPM that would damage the engine fairly quickly. However, operating the engine at high RPM (below the red-line) when it is cold, hot, or during a break-in period can accelerate engine wear. With a manual transmission, excessive engine speed may result from shifting too late or pushing the accelerator while the clutch is disengaged or the transmission is in neutral. With an automatic transmission, the shift schedule normally prevents excessive engine speeds, although excessive engine speed may not be prevented if the vehicle is in neutral or park and the accelerator is pushed down. To determine the cost of this type of wear and tear and/or damage to the engine, a simple model can be employed that combines engine temperature, RPM, and odometer reading (indicative of a break-in period). Of course, more sophisticated models may also be used based on other sensor data to determine engine wear and tear an associated cost for a vehicle sharing application.

For vehicles equipped with four-wheel or all-wheel drive, overheating of various components may occur when there is a large difference in the speeds of the four wheels for an extended time. This may occur when the vehicle is stuck in mud with one wheel spinning, for example, traction control is off, and the driver revs the engine. While the all-wheel drive or four-wheel drive systems usually include a temperature sensor that may be used to determine wear and tear, component damage may also be estimated by logging the wheel speeds when the traction control is off and applying a damage model to the wheel speeds, for example.

Driving with the parking/emergency brake on is a common cause of excessive brake wear due to friction and heat. The purpose of this brake is to provide braking when other systems fail, so it is independent of the normal braking system (unusually having a mechanical rather than hydraulic linkage to the rear brakes). Because it is intended to bypass service braking operation, there may be fewer protections against engaging the brake while the vehicle is moving. Even though there are warning devices and the vehicle performance is reduced when the parking brake is engaged, it is still possible and may occur more frequently than one would expect. Operating the vehicle with the parking/emergency brake engaged may result in damage or excessive wear to the brake pads (or shoes) in addition to damage to the rotor (or drum). In some cases the calipers (or cylinders) may also be damaged. In one embodiment, the existence of this condition is determined by a switch in the parking gear assembly that indicates the parking brake is applied while the vehicle speed sensor indicates that the vehicle is moving. The damage done by driving with the brake set or engaged may be determined from the brake temperature sensor and the odometer. A simple damage model can be used to determine how much brake damage has been caused by the temperature and distance the brake dragging has occurred.

In another example, thermal distortion of the brake rotor may result from quenching a hot brake rotor by immersion in water. This can happen when applying the brake down a hill and driving through a puddle, or by a hard brake application followed by a car wash, for example. The quenching of the rotor can be detected from a sudden temperature reduction of a hot brake. After the brake rotor has been distorted, the brakes typically pulse. The pulsing occurs when the brakes are applied and result in a fluctuation of the brake pressure synchronized with change in brake torque and wheel position. These three inputs can be correlated to determine synchronicity and determine the extent of the warping for use in the vehicle sharing price/charge associated with this type of vehicle event.

Possible glass damage caused by impacts such as gravel from the road can be detected using a vehicle microphone that may also be used by the infotainment system. Glass impacts have a much larger spectral range and characteristic time duration that distinguishes them from other types of noise that the speech recognition microphone normally detects. The intensity of the signal is generally proportional to the energy of the impact. A damage model of the energy of the impact(s) can determine the likelihood the impact has damaged the glass. A time log of the impacts may be used to provide an estimate of the likelihood the glass will need to be replaced when a lease vehicle is returned. Actual glass damage cannot be determined using this method without visual inspection, but the likelihood of damage would still provide an estimate of the condition of the vehicle when it is returned.

In yet another example, electrified vehicles such as hybrid vehicles and electric vehicles include a traction battery that powers an electric motor. Traction batteries in vehicles with electric drivetrains can be damaged by vibration, heat, cold, excessive charging and discharging rates and over/under charging, for example. While the vehicle control system normally controls operation to reduce or eliminate permanent damage to the traction battery for various operating conditions, these factors can be used in a battery damage model to determine the state of health of the battery and the remaining life of the battery under different use conditions. For example, a traction battery may get damaged from heat or have reduced life when subjected to continuous deep charge/discharge cycles in a location where there are hills, but still have adequate battery life for resale.

As previously described, various sensors may also be used to determine ambient operating conditions for the vehicle that may contribute to wear and tear. Ultraviolet (UV) light from the sun is known to oxidize paint on metal surfaces of the vehicle, reducing the life of the paint. UV light may also damage and fade vehicle interior components resulting in reduced resale value. The extent of the damage may depend on how long the vehicle is exposed, the intensity of the light, and its angle of incidence to the vehicle surfaces, for example. The direction of the sun with respect to the vehicle can be determined by the navigation system from the bearing of the vehicle, longitude, latitude, date and time it receives from the global positioning system using a well-known equation. The transmissivity of the atmosphere can be determined from weather data available on the internet cloud and the protection from the sun provided by trees, structures, etc. can be determined by satellite photos of the shade produced, the vehicle pyrometer and the interior thermometer that determines the exposure from the heat of the vehicle. All the data can be combined into a model that predicts the life of the paint. Users in sunny climates may be charged more unless they park their shared vehicles in sheltered areas.

Exposure of a vehicle to salt water, particularly when the paint is damaged by chipping from material tossed up by the wheels, may reduce the life of vehicle components by corroding the coating that protects the structural steel from rusting/oxidation. Some vehicles may include a rain/snow detector that automatically turns on the windshield wipers in wet weather. If snow is detected by this sensor and by the traction control and antilock braking systems, the system may determine that the vehicle is driving in the snow and is likely accumulating salt on vehicle components. Salt water can also be detected using a very simple detector. The corrosion rate of steel is also very sensitive to ambient temperature, which is measured using the ambient temperature sensor. Combining these inputs into a damage model can determine the rate of damage or wear and tear, which can be integrated over time to provide an indication of accumulated damage for a trip or rental period.

Figure 9:
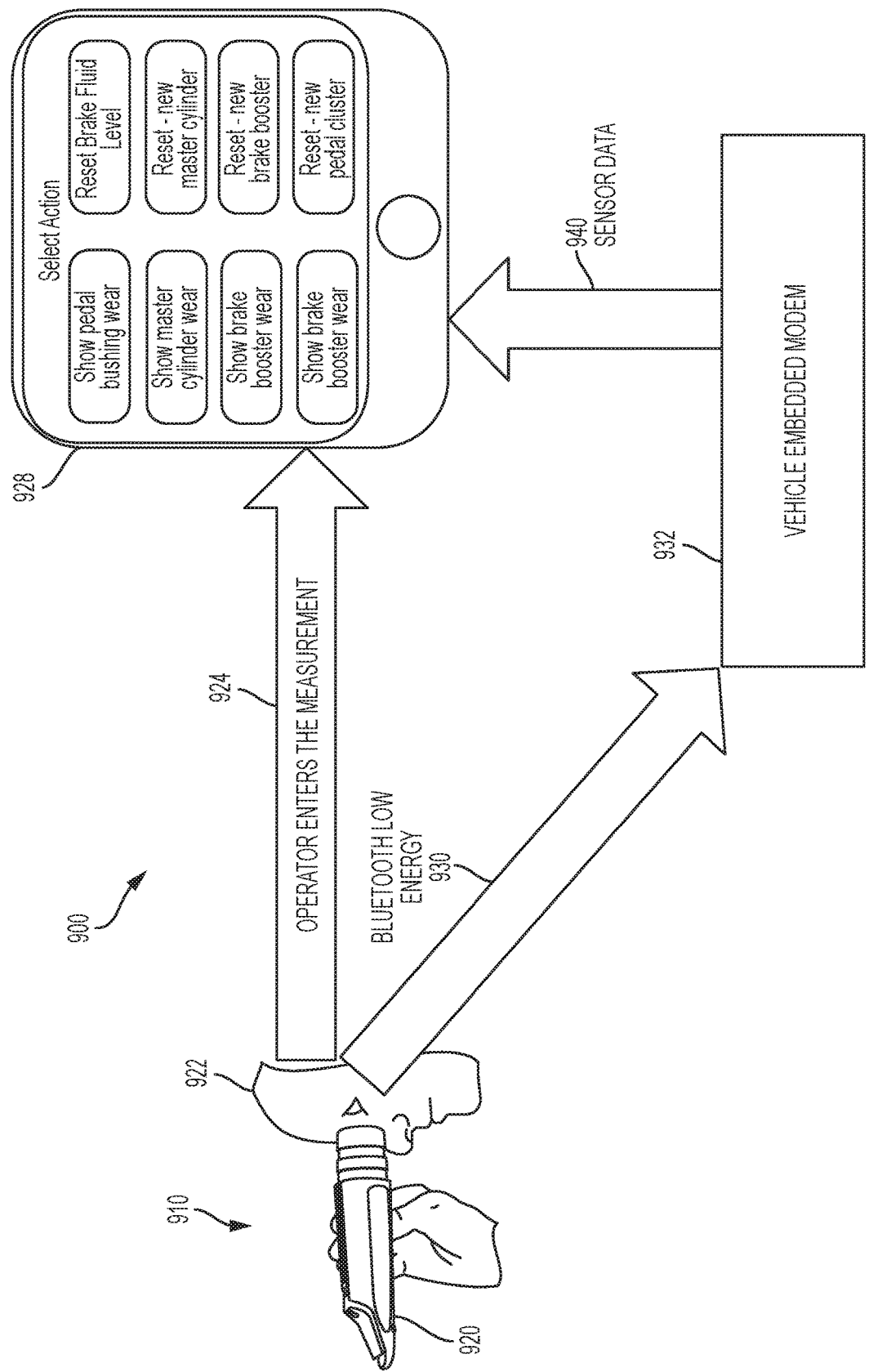
FIG. 9 is a block diagram illustrating an Internet of Things (IoT) implementation for collecting data from vehicle-related sensors or tools for use by a system or method for vehicle sharing of a representative embodiment.

FIG. 9 is a block diagram illustrating an Internet of Things (IoT) implementation for collecting data from vehicle-related sensors or tools for use by a system or method for vehicle sharing of a representative embodiment. As generally illustrated in FIG. 9, system 900 may include a service tool 910 that may have one or more embedded sensors that communicate vehicle-related data that may be used to detect wear and tear. In the illustrated example, a handheld optical refractometer 920 is operated by a user 922, such as a vehicle owner or service technician, to detect water content of various vehicle fluids, such as engine oil, transmission oil, brake fluid, power steering fluid, etc. Water content may increase over time, perhaps by 2% per year, for example. More rapid increases may indicate contamination associated with a particular use or user. Water contamination may lead to reduced boiling point, increased viscosity (especially at low temperatures), and/or increased corrosiveness of various components. For brake systems with copper parts such as brake lines, corrosion of the copper may begin with high levels of dissolved water. This leads to high copper levels in the fluid which can be measured by various other tools, such as brake fluid strips, for example.

Data collected by an external sensor or service tool 910 may be wirelessly transferred as indicated at 930 to a vehicle embedded modem 932 or other computer or processor of the VCS. Various types of wireless communication may be used, such as Bluetooth Low Energy (BLE), for example. The vehicle embedded modem 932 may act as a hub to transfer sensor data 940 to a linked or connected mobile device 928. The vehicle embedded modem 932 may also transfer data directly or indirectly (through mobile device 928) to the CDN for analysis and processing to detect and price wear and tear for the vehicle sharing trip or rental period as previously described.

Alternatively, or in combination, operator 922 may enter measurements from a service tool 910 as represented at 924 to an app or user interface of mobile device 928. The processor of mobile device 928 receives and processes the data received via the user interface, or via the vehicle embedded modem or transceiver to provide a vehicle sharing cost or charge associated with the wear and tear detected by the sensor data or tool measurements.

As generally illustrated by the representative embodiment of FIG. 9, the vehicle sharing system or method may receive vehicle-related data from sensors or tools external to the vehicle. The data may be manually entered using a connected mobile device or the vehicle HMI, or may be wirelessly transmitted to the vehicle or linked mobile device by sensors, or tools having embedded sensors and appropriate communication technology.

FIGS. 10A-10G illustrate representative graphs for detecting wear and tear of representative vehicle components in a system or method for vehicle sharing according to one embodiment. Data received from vehicle sensors and/or service tools and external vehicle-related sensors may be compared to expected relationships between various operating parameters to detect wear and tear and related anticipated maintenance/repair costs. The data analysis may be performed in the cloud within the CDN, by the VCS, or by a mobile device depending on the computational power and storage requirements for executing a particular damage or wear and tear model, for example.

Figure 10A:
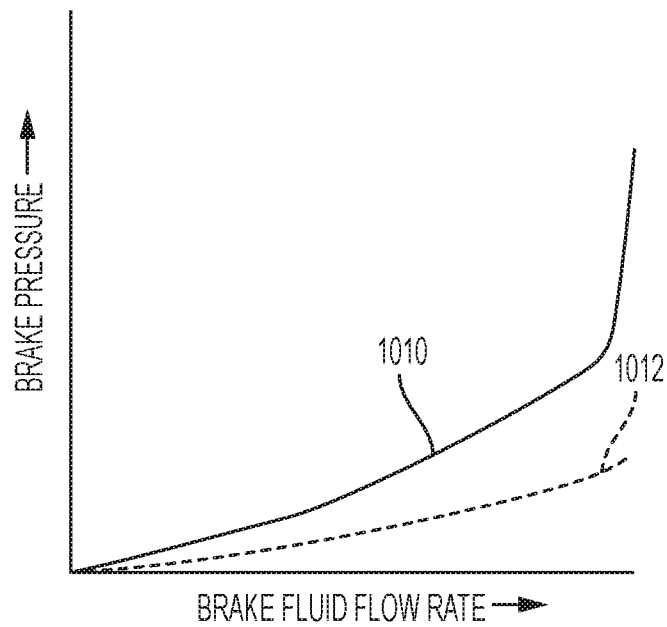
FIGS. 10A-10G illustrate representative graphs for detecting wear and tear of representative vehicle components in a system or method for vehicle sharing of a representative embodiment.
Figure 10B:
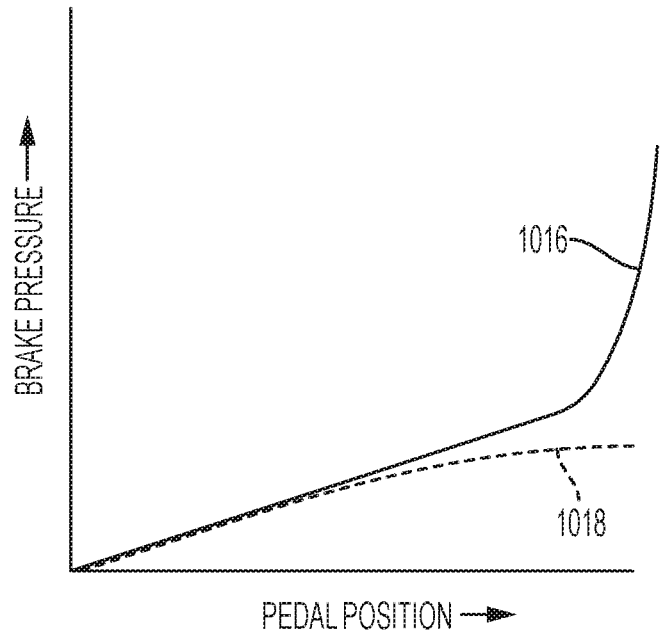
Figure 10C:
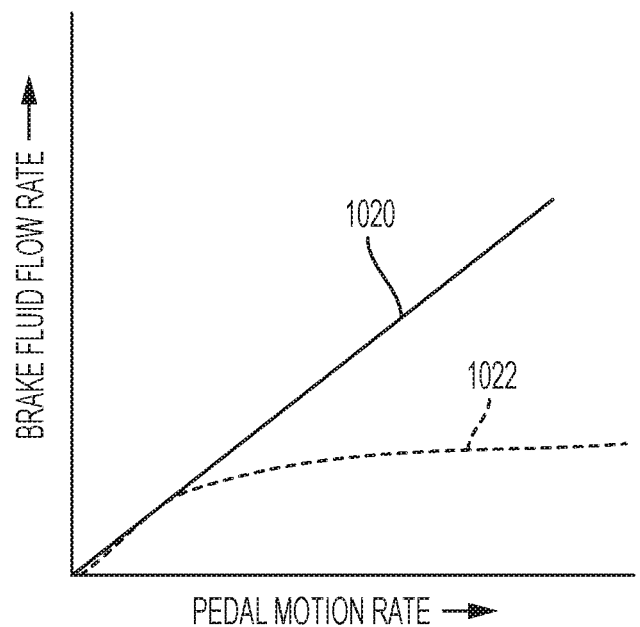
Figure 10D:
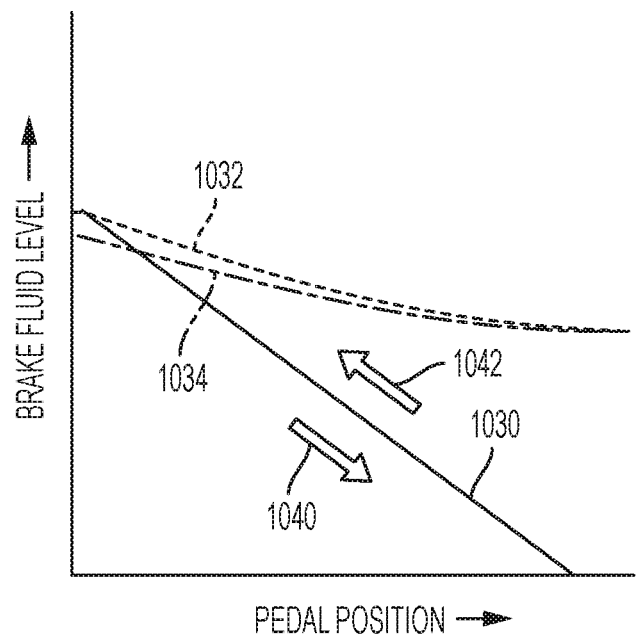

FIG. 10A illustrates the relationship between brake pressure and brake fluid flow rate. Line 1010 represents expected values for brake pressure as a function of brake fluid flow rate in a representative application, while line 1012 represents vehicle data collected from vehicle sensors and/or external sensors or service tools. The data represented by line 1012 may indicate a potential problem with the brake lines, hoses, caliper seals, etc. and may be used to assess an associated fee or pricing structure for the vehicle sharing transaction. Similarly, FIG. 10A illustrates the relationship between brake pressure and brake pedal position. Line 1016 represents data corresponding to expected values for normal operation while line 1018 represents vehicle data that may indicate wear and tear or damage related to a bad seal or leak within the brake system. Likewise, FIG. 10C illustrates the relationship between brake fluid flow rate and brake pedal motion rate. Line 1020 represents expected values while line 1022 represents vehicle data that may indicate a problem with the master cylinder seals, for example. FIG. 10D represents the relationship between brake fluid level and brake pedal position with line 1030 representing expected data values as the brake pedal is depressed as represented by arrow 1040 and released as represented by arrow 1042. Vehicle data represented by line 1032 may indicate a leak in the lines, hoses, calipers, etc. if the fluid level decreases after a pedal down/release cycle. Vehicle data represented by line 1034 may indicate leaking master cylinder piston seals corresponding to the fluid level not decreasing as expected in response to the pedal down/release cycle.

Figure 10E:
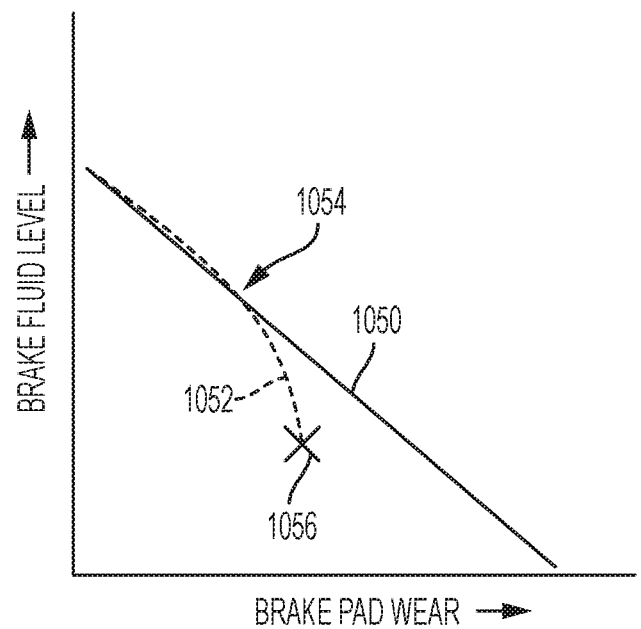
Figure 10F:
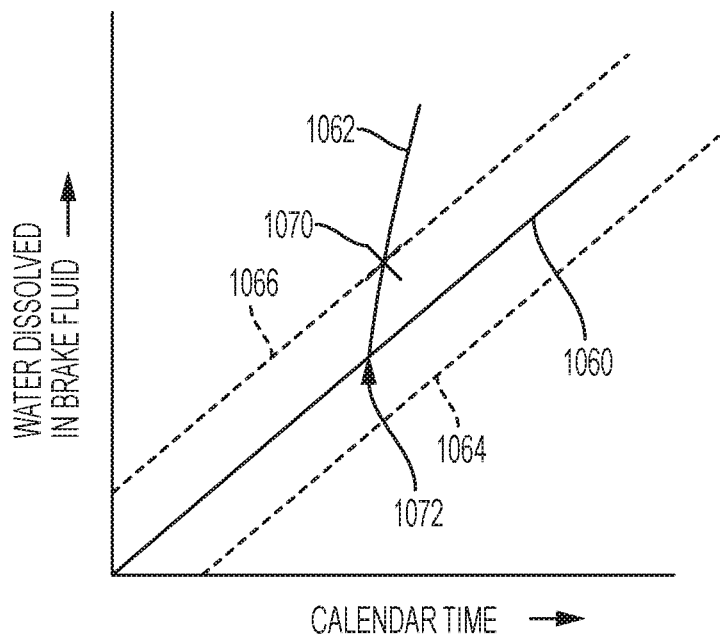

Brake fluid level can be used to estimate total brake pad wear as illustrated by the graph in FIG. 10E. Expected values for brake fluid level as a function of brake pad wear are represented by line 1050, while line 1052 represents vehicle data. Onset of rapid brake wear, possibly due to a warped rotor, for example, may be indicated at 1054 as the vehicle data departs from expected values of line 1050. Premature failure is represented at 1056, such as one brake pad wearing faster than the others, for example. FIG. 10F illustrates the relationship between water dissolved in brake fluid over calendar time with expected values represented by line 1060 and vehicle data represented by line 1062. A detection corridor may be defined by a lower threshold 1064 and an upper threshold 1066 with a trigger or flag set when the vehicle data is outside of the corridor, beginning at 1070, for example. The detection corridor or contour may be determined based on a statistical probability that the data excursion corresponds or is likely to correlate with a particular condition or component failure that requires maintenance or repair. Vehicle data may begin to deviate from expected values as represented at 1072 due to a component failure that allows water into the brake hydraulic system, for example.

Figure 10G:
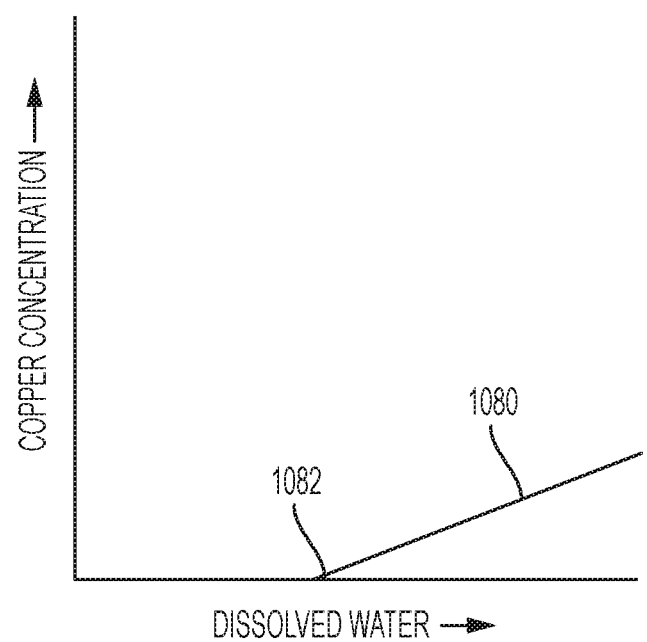

FIG. 10G represents copper concentration as a function of dissolved water in a vehicle brake system. Similar to the detection corridor illustrated in FIG. 10F, vehicle data represented by line 1080 may indicate potential wear and tear when the data exceeds a corresponding threshold of dissolved water, as represented at 1082. At this level of dissolved water within the brake fluid, damage to metal components may begin. However, if the brake system components are stainless steel rather than copper, no copper would appear in the fluid and a different graph or indicator may be used, such as one based only on the amount of dissolved water, for example. Individual vehicle configurations and corresponding components may be provided by the CDN or web service to communicate the relevant thresholds or wear and tear evaluations to the VCS or mobile device app for a particular vehicle and corresponding wear and tear cost associated with vehicle sharing transaction.

As such, embodiments according to the present disclosure may provide one or more advantages. For example, vehicle sharing operators may use detailed vehicle data collected from various vehicles associated with a particular user to determine pricing to account for expected wear and tear based on driving behavior, route, vehicle use, etc. Similarly, vehicle sharing operators or vehicle owners may monitor actual vehicle use and associated wear and tear costs for a particular transaction. Historical data may be used to determine relative risk of a particular user, route, type of use, etc. to provide a basis for granting or denying a particular vehicle sharing request. Use of distributed cloud-based data storage and analysis facilitates more complex models for evaluation and pricing of vehicle sharing while providing the capability for real-time payment calculation during a sharing period, or calculated upon conclusion of the period. Aggregation and analysis of vehicle sharing data may leveraged by various end users to provide targeted marketing and more accurate pricing of services, such as extended service plans, resale values, and the like.

While representative embodiments are described above, it is not intended that these embodiments describe all possible forms of the claimed subject matter. Rather, the words used in the specification are words of description rather than limitation, and it is understood that various changes may be made without departing from the spirit and scope of the disclosure. Additionally, the features of various implementing embodiments may be combined to form further embodiments that are not explicitly described or illustrated. While various embodiments may have been described as providing advantages or being preferred over other embodiments or prior art implementations with respect to one or more desired characteristics, as one of ordinary skill in the art is aware, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. Embodiments described as less desirable than other embodiments or prior art implementations with respect to one or more characteristics are not necessarily outside the scope of the disclosure and may be desirable for particular applications.

What is claimed is:

1. A vehicle sharing system comprising:
   a processor programmed to:
      output a vehicle sharing cost associated with anticipated maintenance of a vehicle component based on sensor data associated with operation of a vehicle by a vehicle sharing user during a trip, wherein the processor calculates the vehicle sharing cost by comparing the sensor data to previously stored expected values in a vehicle component wear model.

2. The vehicle sharing system of claim 1 further comprising a vehicle component sensor and an external sensor that provide the sensor data associated with operation of the vehicle, the processor further programmed to communicate the vehicle sharing cost for display on a vehicle HMI.

3. The vehicle sharing system of claim 1 further comprising:
   a cloud based server that receives the sensor data from the processor and calculates the vehicle sharing cost using an analytical model; and
   a display that receives the output and displays the vehicle sharing cost and presents cost-saving coupons.

4. The vehicle sharing system of claim 1, the processor further programmed to determine a route for the trip based on the sensor data from the trip, and calculate the vehicle sharing cost based on historical sensor data associated with the route.

5. The vehicle sharing system of claim 1, the processor further programmed to determine a route for the trip and provide an alternative route based on a lower vehicle sharing cost associated with the alternative route.

6. The vehicle sharing system of claim 1 wherein the processor comprises a mobile device processor wirelessly linked to the vehicle.

7. The vehicle sharing system of claim 1, the processor further programmed to calculate the vehicle sharing cost based on vehicle location during the trip, the vehicle location determined based on the sensor data.

8. The vehicle sharing system of claim 1 further comprising:
   a vehicle computing system (VCS) embedded within the vehicle and in communication with a vehicle sensor, the VCS storing the sensor data in an associated memory and selectively wirelessly communicating the sensor data to the processor.

9. The vehicle sharing system of claim 1, the processor wirelessly receiving the sensor data from the cloud.

* * * * *